Figure 3:
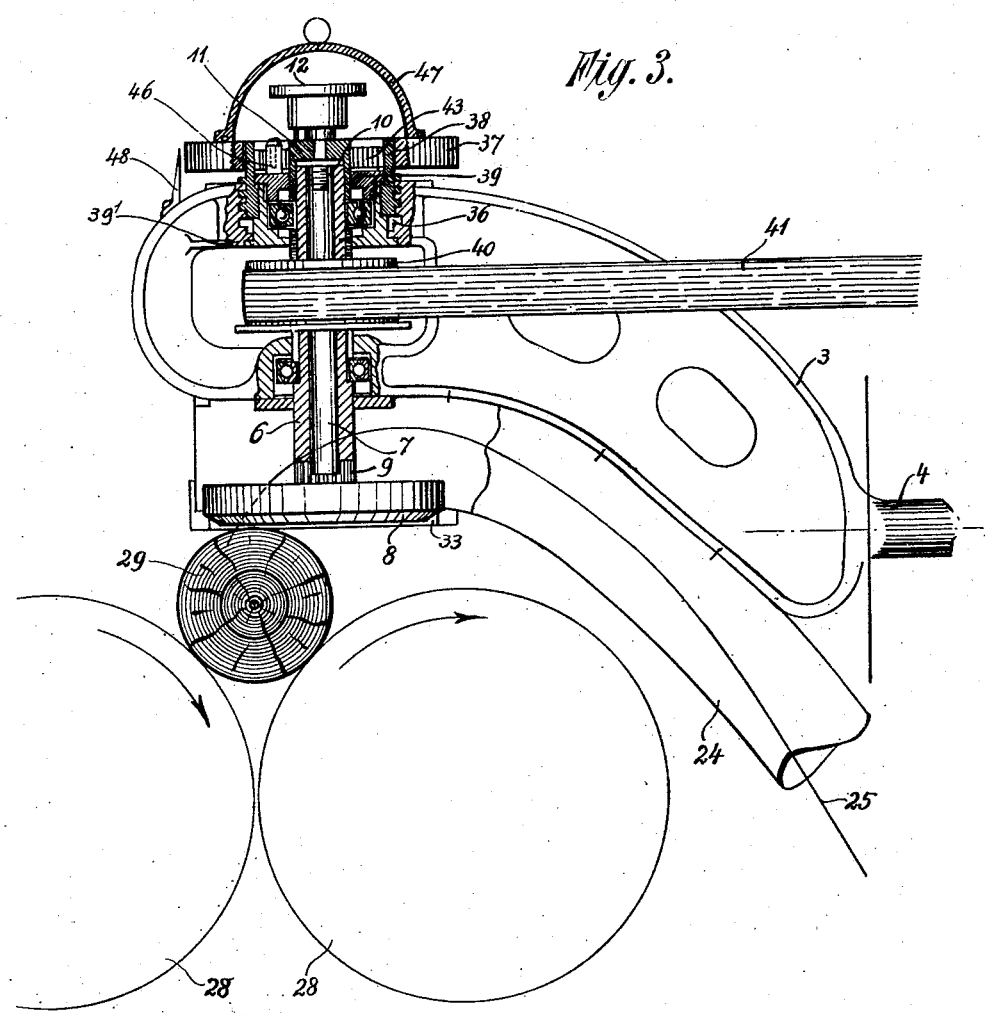

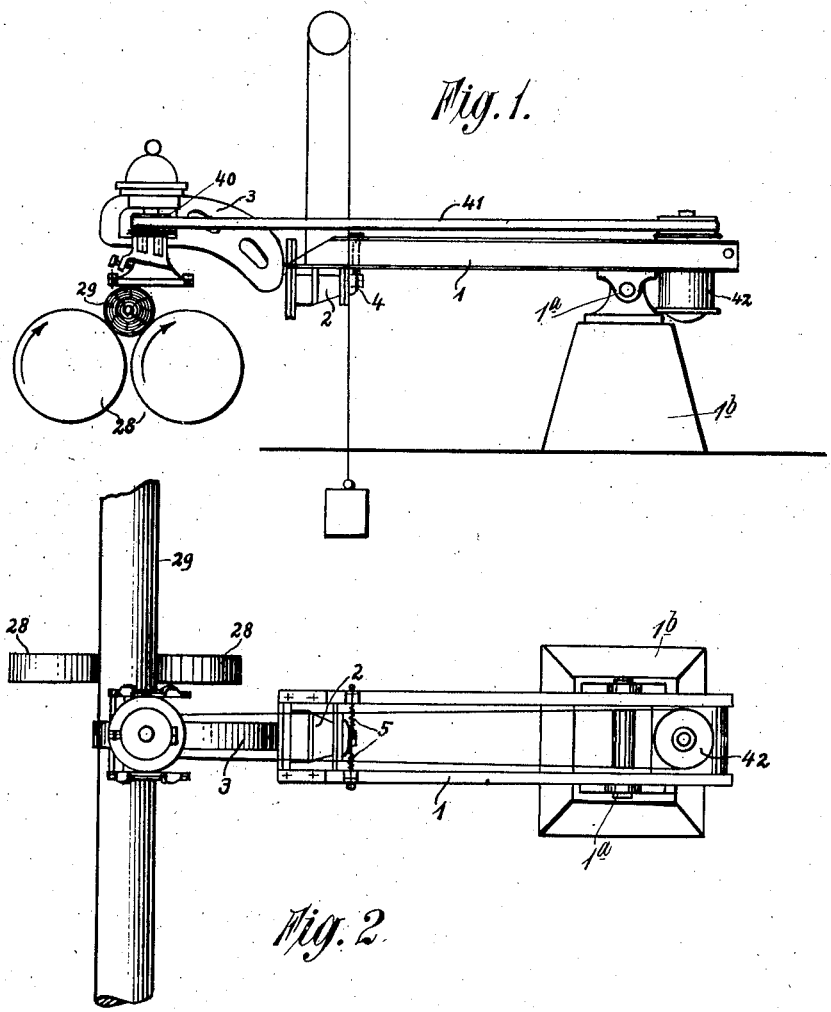

Feb. 3, 1931. F. HIMMELSBACH ET AL 1,791,242
LOG BARKING MACHINE
Filed Sept. 13, 1926  3 Sheets-Sheet 2

INVENTORS:
Franz Himmelsbach,
Hermann Tormin.
by their ATTORNEY:

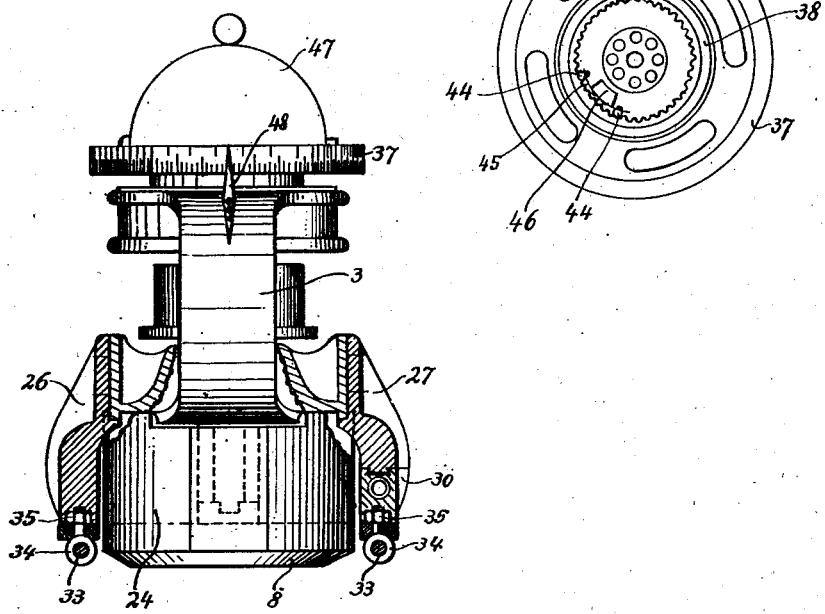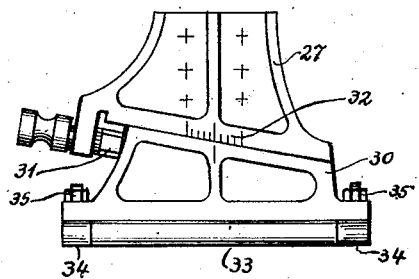

Patented Feb. 3, 1931

1,791,242

UNITED STATES PATENT OFFICE

FRANZ HIMMELSBACH AND HERMANN TORMIN, OF FREIBURG, IN BADEN, GERMANY, ASSIGNORS, BY MESNE ASSIGNMENTS, TO IMPREVA HOLZIMPRAGNIERUNG UND HOLZVERWERTUNG AKTIENGESELLSCHAFT, OF CHARLOTTENBURG, GERMANY, A JOINT-STOCK COMPANY

LOG-BARKING MACHINE

Application filed September 13, 1926, Serial No. 135,183, and in Germany July 23, 1926.

The barking of long logs by machinery, for example making telegraph poles or the like, has hitherto not been very satisfactory in practice, because in the machines used the cutter-head or cutter-wheel is, apart from its rotation, only movable in one direction, and consequently is unable adequately to accommodate itself to irregularities of the logs. It has also been difficult or impracticable quickly to adjust the cutter, in the course of the work, for different depths of cut.

According to our invention the defect of inadequate accommodation of the cutter head to the log is removed by arranging that the cutter head is rotatably mounted on a pivoted arm or beam, so that it is not only movable to and from the axis of the log, by rocking the arm, but is also capable of a rocking movement about an axis extending transversely of the axis of rotation of the arm. This transverse axis is preferably approximately tangential to the log circumference at the part where the cutter is operating. The rocking movement or "wabble" about the said transverse axis is preferably imparted by means of two feelers resting on the log at opposite sides of the cutter head, one of these feelers being vertically adjustable for regulating the tilt which is given to the cutter head for the purpose of barking a tapering log without producing ridges, which are unsightly and at which the wood is liable to splinter. For regulating the depth of cut the cutter head is adjustable in its carrier without interfering with the adjustment of the said feelers.

The lengthwise movement of the log under the cutter head produces a lateral thrust on the cutter head, which tends to twist it, if its point of support is a substantial distance above the log, but if, as above indicated, the cutter head is carried by a pivot whose axis is level or nearly level with the cutting plane there is no effective leverage for such twisting.

In the annexed drawings

Fig. 1 is a diagrammatic side elevation of the barking machine.

Fig. 2 a plan view thereof.

Fig. 3 a section through the machine head on an enlarged scale.

Fig. 4 a front elevation of the machine head,

Fig. 5 a plan view of the hand-wheel for alteration of the shaving thickness.

Fig. 6 is a side view of the upwardly adjustable feeler or touch-rocker.

1 is a rocking beam pivoted on a horizontal axle $1^a$ carried by a pillar $1^b$. The shorter arm of the beam 1 carries a motor 42 for a purpose hereinafter referred to, and at the end of the longer arm of the beam 1 is a socket 2.

The machine-head 3 is pivoted in the socket 2 by means of a bolt 4 parallel with the arm 1 and is held in the normal erect position by two draw-springs 5 (see Fig. 2) or the like. In the outer end of the machine-head 3 (see Fig. 3) is a vertical bearing for the hollow shaft 6 which is adjustable in the direction of its axis and which serves to hold the stem 7 of the cutter-head 8. The axis of the bolt or pivot 4 is approximately level with the cutting plane of the usual chisel-like cutters, which project slightly from the face of the cutter head, but are not shown in the drawing. The easy loosening of the connection between cutter-head and hollow shaft 6 required for a quick exchange of the head 8 is obtained in two ways: first by arrangement of a clutch coupling 9 (Fig. 3) between cutter-head 8 and hollow shaft 6, and secondly by a screw 10, passing through a cap 11 and screwed into the end of the stem 7 by means of the milled head 12.

The machine head 3 carries the two touch-rockers 26 and 27 (see Figs. 4 and 6). These prevent the cutter-head 8 itself from coming into immediate contact at its lower surface with the log 29 revolved underneath the cutter head by the two rotatory wheels 28. One of these two touch-rockers is adjustable upwardly. The upward movement can be effected by moving the lower part 30 of the touch-rocker 27 along an oblique plane on the upper part of the touch-rocker (see Fig. 6) by means of an adjusting-screw 31. For reading off direct the difference in height of the touch-rocker the upper part thereof is provided with a scale 32. A rod 33 (Fig. 6) is secured to the lower part of each of the touch-rockers 26 and 27 by means of the eye bolts 34 and nuts 35, by which the rod 33 is pressed to the lower side of the rocker (Fig. 6) and prevented from rotating automatically. After the portion of the sliding surface of the rod lying on the trunk becomes worn, the nuts 35 can be loosened and the rod 33 can be turned on its longitudinal axis until an unused portion again comes to position to lie on the trunk.

In the present invention, for the separate treatment of each trunk from end to end, a displacement of the cutter-head 8, possible during the working of the machine, is provided for the exact immediate alteration of the thickness of the shaving, in the following manner:—The machine-head 3 (Fig. 3) is provided with the interior screw-thread 36, in which a screw-sleeve 38 provided with a hand-wheel 37 can be moved up and down. Through this movement the ball-bearing sleeve in two parts 39 39¹ surrounding the hollow shaft 6 is carried along and with it the keyed-on belt pulley 40 together with the hollow shaft 6 and the stem 7 of the cutter head 8. The belt pulley 40 receives its motion by means of the belt 41 from the motor 42 (Fig. 1) fastened on the pendulous arm 1. In order that the cutter-head may not of itself move upwards during the working, a catch ring 43 is provided inside the screw-sleeve 38 (see Fig. 5), into which one or two bolts 44 are forced by a spring 45. The spring 45 is secured to a knob 46 on the upper part of the ball-bearing sleeve 39, which does not rotate with the cutter head.

For protection of the operator from contact with the milled head 12 (Fig. 3) rotating at many thousands of revolutions, a hood-guard 47 is provided on the normally stationary hand-wheel 37 which effects the setting of the depth of cut. On the machine-head 3 (Fig. 3) there is also the scale indicator 48, from which by means of graduated divisions provided on the hand-wheel 37 the desired depth of cut can be immediately secured during the operation of the cutter-head.

What we claim as our invention and desire to secure by Letters Patent of the United States is:—

1. In a log barking machine the combination of an arm, a machine head carried by said arm, a cutter head carried by said machine head, means for rotating the cutter head about its axis, means for axial adjustment of the cutter head, the said cutter head comprising a hollow shaft and the cutter having a stem for entering said shaft, a clutch between said cutter and the shaft end and a screw for securing the cutter stem in said shaft.

2. In a log barking machine the combination of an arm, a machine head carried by said arm, a cutter head carried by said machine head, means for rotating the cutter head about its axis, touch rockers carried by said arm one on each side of said cutter head, means for vertical adjustment of one of said rockers, means for axial adjustment of the cutter head independently of said rockers, the said cutter head comprising a hollow shaft and the cutter having a stem for entering said shaft, a clutch between said cutter and the shaft end and a screw for securing the cutter head stem in said shaft.

3. In a log barking machine the combination of an arm, a machine head carried by said arm, a cutter head carried by said machine head, means for rotating the cutter head about its axis, touch rockers carried by said arm and means for axial adjustment of the cutter head independently of said rockers, said means comprising a screw thread and machine head and a bearing for the cutter head having a screw thread cooperating with the aforesaid screw thread.

4. In a log barking machine the combination of an arm, a machine head carried by said arm, a cutter head carried by said machine head, means for rotating the cutter head about its axis, touch rockers carried by said arm and means for axial adjustment of the cutter head independently of said rockers, said means comprising a screw thread and machine head and a bearing for the cutter head having a screw thread cooperating with the aforesaid screw thread, together with a hand wheel for rotating the cutter head bearing.

5. In a log barking machine the combination of an arm, a machine head carried by said arm, a cutter head carried by said machine head, means for rotating the cutter head about its axis, touch rockers carried by said arm one on each side of said cutter head, means for vertical adjustment of one of said rockers, means for axial adjustment of the cutter head independently of said rockers, the said cutter head comprising a hollow shaft and the cutter having a stem for entering said shaft, a clutch between said cutter and the shaft end and a screw for securing the cutter head stem in said shaft, the said adjusting means comprising a hand wheel, and a hood carried by said hand wheel for the purpose set forth.

6. In a log barking machine the combination of an arm capable of rocking movement, a cutter head, a carrier for said cutter head rotatably mounted on said arm so that said carrier is free to rock on said arm, the axis of rotation of said carrier on said arm extending transversely of the axis about which the arm can rock, feelers connected to said carrier at opposite sides of the cutter head, for contacting with the log and means for vertical adjustment of one of said feelers.

7. In a log barking machine the combination of an arm capable of rocking movement, a cutter head, a carrier for said cutter head rotatably mounted on said arm, the axis of rotation of said carrier on said arm extending transversely of the axis about which the arm can rock, feelers connected to said carrier at opposite sides of the cutter head, for contacting with the log, means for vertical adjustment of one of said feelers, and means for axial adjustment of said cutter head in said carrier independently of said feelers.

In witness whereof we have signed this specification.

FRANZ HIMMELSBACH.
HERMANN TORMIN.